Dec. 24, 1940.   C. J. MARTIN   2,225,750
LIGHTWEIGHT COUPLING FOLLOWER
Filed March 19, 1940   2 Sheets-Sheet 1
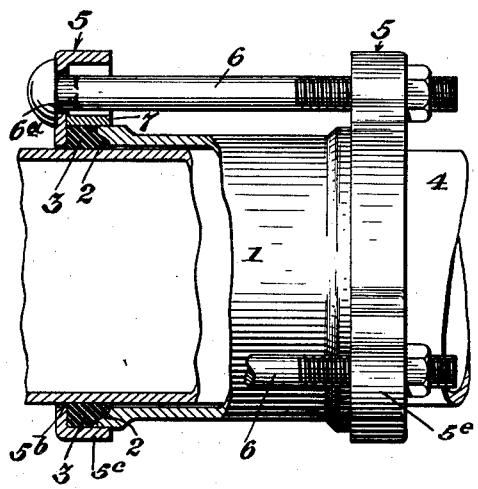
Fig. 1.
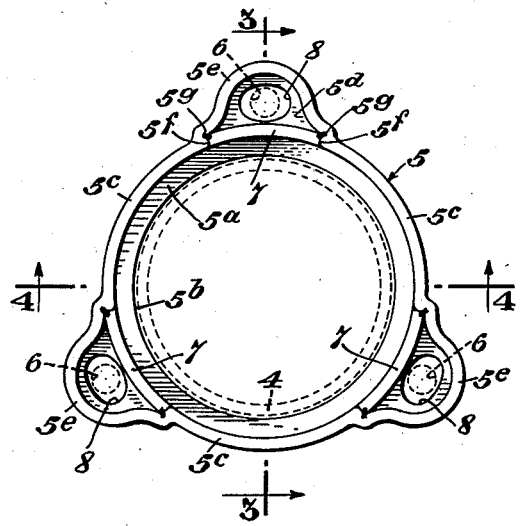
Fig. 2.
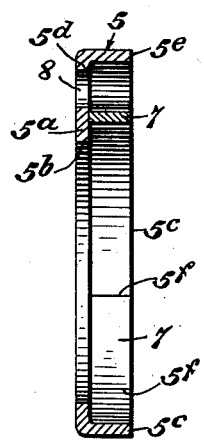
Fig. 3.
Fig. 4.
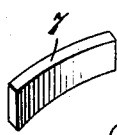
Fig. 5.
INVENTOR
Clyde J. Martin
BY
Louis Kirkwood Whitaker
ATTORNEY Dec. 24, 1940. C. J. MARTIN 2,225,750
LIGHTWEIGHT COUPLING FOLLOWER
Filed March 19, 1940 2 Sheets-Sheet 2
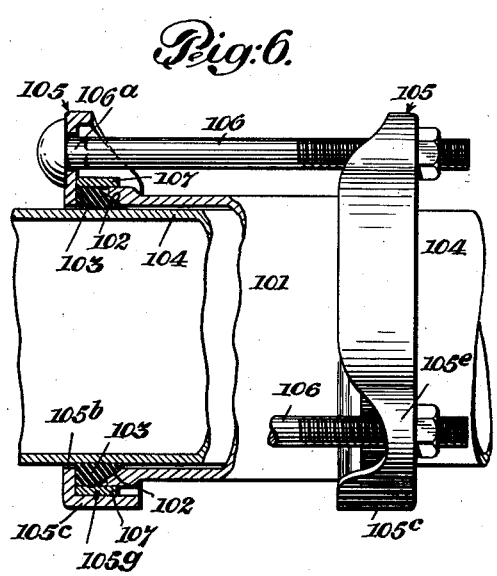
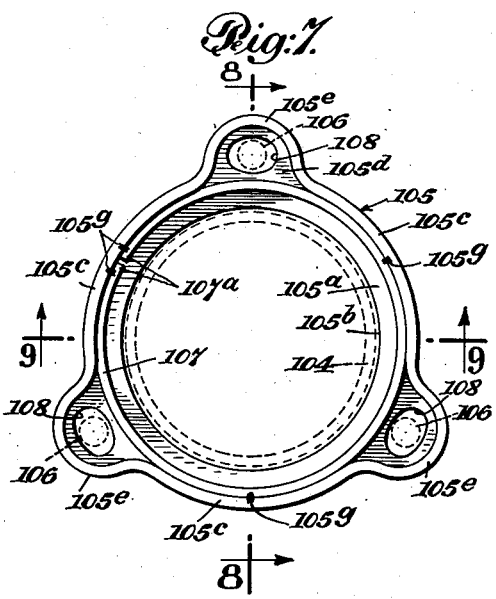
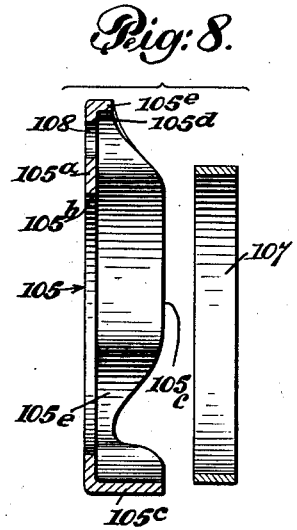
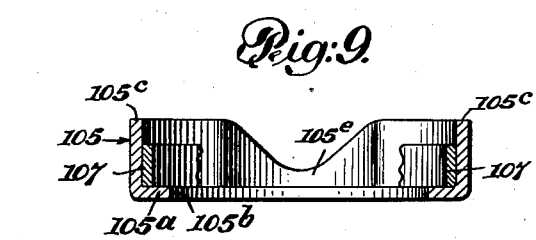
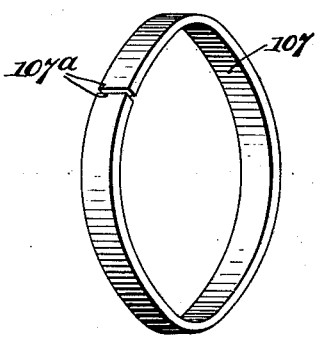
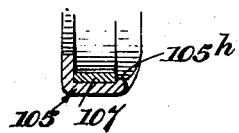
INVENTOR
ATTORNEY Patented Dec. 24, 1940

2,225,750

UNITED STATES PATENT OFFICE 2,225,750

LIGHTWEIGHT COUPLING FOLLOWER

Clyde J. Martin, Bradford, Pa., assignor to Dresser Manufacturing Company, Bradford, Pa., a corporation of Pennsylvania Application March 19, 1940, Serial No. 324,867

3 Claims. (Cl. 285—135)

My invention consists in the novel features hereinafter described, reference being had to the accompanying drawings, which illustrate two embodiments of the same, selected by me for purposes of illustration, and the said invention is fully disclosed in the following description and claims.

The object of my invention is to produce a lightweight coupling follower for pipe couplings for plain end pipe sections intended particularly for use in rubber packed couplings of the well known "Dresser" type, although the said followers may be employed for any other purpose for which they are found suitable or desirable. The "Dresser" type pipe couplings comprise ordinarily a middle ring or sleeve, which extends over the meeting ends of the plain end pipe sections, and is provided at each end with a packing recess to receive a gasket of rubber or rubber composition, and in connection with the middle ring or sleeve, two followers are employed each having a packing recess to receive and enclose one of the packing rings, and with outwardly extending flange portions provided with bolt holes. The coupling is completed by through bolts extending from one follower to the other and provided with nuts. These couplings, while extremely efficient, are expensive and heavy, and the initial expense of the coupling is increased by the freight charges for their transportation to their point of use. There is naturally a large and increasing demand for a lighter type of coupling which can be more cheaply manufactured, sold and transported at lower costs.

As a result of extensive experiments I have found that so far as the middle ring or sleeve is concerned, the packing rings and the size and number of bolts employed in couplings of the various sizes necessary, no material change can be made from the present standards without reducing the strength and ruggedness of the coupling, and that the desired economical result could only be accomplished by a change in the construction of the followers.

In carrying out my invention, I have produced a lightweight follower capable of use with the ordinary middle ring, packing rings and bolts of the usual "Dresser" coupling, and which, by virtue of its novel construction, can be made more cheaply and much lighter, size for size, than the followers ordinarily employed in connection with couplings of this type.

In the accompanying drawings, which illustrate two forms in which I have contemplated embodying my invention, Fig. 1 is a view of a "Dresser" type pipe coupling, a portion of the figure being illustrated in elevation and a portion in section, and showing one form of my improved follower embodied therein.

Fig. 2 is a plan view of one of the followers shown in Fig. 1.

Fig. 3 is a sectional view of the follower, on the line 3—3 of Fig. 2.

Fig. 4 is a sectional view of the follower, on the line 4—4 of Fig. 2.

Fig. 5 is a detail view of one of the bridge pieces employed in the construction of this form of follower.

Fig. 6 is a view similar to Fig. 1, in which the followers embody a slight modification of my invention.

Fig. 7 is a plan view of one of the followers shown in Fig. 6.

Fig. 8 is a detail section on the line 8—8 of Fig. 7, showing the main body of the follower and the annular bridge piece detached therefrom.

Fig. 9 is a section of the follower, on the line 9—9 of Fig. 7.

Fig. 10 is a perspective of the annular bridge piece.

Fig. 11 is a detail view of a portion of the coupling illustrating a swedged portion of the exterior flange of the main body of the follower holding the annular bridge piece in position.

Referring to the embodiment of my invention illustrated in Figs. 1 to 5, inclusive, I have illustrated in Fig. 1, the component parts of the well known "Dresser" coupling, which include the middle ring I provided at each end with packing recess 2 to receive one of the packing rings 3, which is to be wedged into the packing recess 2 to form a tight joint between the middle ring and the plain end pipe section 4, which extends into the middle ring. 5—5 represent the followers constructed in accordance with my invention, and connected by through bolts 6, 6 for the purpose of compressing the packing rings and forcing them into the packing recesses 2 of the middle ring.

The follower, indicated as a whole at 5, comprises a main body which is conveniently formed by stamping it from sheet metal or forming it by a die process, or in any other suitable way. The main body comprises an annular plate portion 5a having a central aperture, indicated at 5b, which forms the pipe aperture to surround the adjacent pipe section. The outer edges of the plate section 5a are provided with curved flange portions 5c, perpendicular to the plate member, separated from each other and curved concentrically with the axis of the pipe aperture 5b. The number of these lateral flange portions will depend upon the number of bolts intended for use with the coupling and may be two or more. In the present instance the coupling is shown as provided with three bolts, and there are therefore three of these curved flange portions 5c. The plate portion 5a is provided at equal distances around the center of the pipe aperture with outwardly extending bolt engaging portions 5d, three of which are shown in the drawings and these bolt engaging portions are also provided with perpendicular flanges 5e formed integrally with the flanges 5c and connecting the adjacent ends of the flanges 5c as shown. At these points of connection the flanges form an approximately radial shoulder, indicated at 5f, and between each pair of shoulders 5f there is inserted a separately formed curved bridge piece 7, three of such bridge pieces being illustrated in the drawings, which are spot welded to the adjacent shoulders of the flanges 5c and 5e, as indicated at 5g. These bridge pieces are curved coaxial with the center of the pipe aperture, and their inner faces form continuations of the inner faces of the adjacent flange portions 5c and as shown extend across the outwardly extending flange portions 5e, following the outline of the outer edges of the bolt engaging portions 5d. These bolt engaging portions are provided with bolt holes, indicated at 8, which are preferably of oval form to engage oval portions 6a adjacent to the heads of the bolts, in the usual and well known manner, to prevent the bolts from turning when the bolts and nuts are screwed up.

It will be seen that by my improved construction, an angular recess is formed between the portion of the plate member 5a immediately surrounding the pipe aperture, which extends in a plane perpendicular to the axis of the pipe, and an annular flange coaxial with the bolt hole, and comprising the integral flange portions 5c, and the bridge pieces 7, which will fit over the outer portion of the packing ring 3 and completely enclose and support it.

This novel construction of follower provides the necessary strength to effect the compression of the packing ring, with the minimum amount of metal, and consequently weight. It will also be noted that at the shoulders 5f the bridge pieces 7 are not only held in place by the spot weld before referred to but that their end portions engage the adjacent portions of the flanges 5d so that they additionally resist any outward pressure due to the compression of the gasket.

It will be understood that in some of the smaller sizes of couplings, where only two through bolts are employed, the main body of the follower will be provided with only two of the bolt engaging extensions, in which case there will be only two of the integral exterior flange portions 5c and 5e, and two of the bridge pieces 7 secured into position in the manner previously described. In larger sizes, in which more than three bolts are required, there will be the same number of bridge pieces as the number of bolts employed, and the construction will otherwise be exactly as previously described.

In Figs. 6 to 11, which illustrate a slight modification of the construction previously described, the parts corresponding with those hereinbefore referred to are given the same reference numerals with the addition of 100, to avoid repetition. In this construction, in which separate bridge pieces are not employed, the plate member 105a of the follower is provided with the exterior flange portions 105c and 105e, substantially as hereinbefore described, except that the shoulders indicated at 5f in Fig. 2 for example are omitted, and the exterior flange portions 105c and 105e form a practically continuous flange, following the outer edge of the plate member with its bolt engaging extensions 105d. It is not essential that the flange portions 105e which substantially surround the bolt holes should be as high as the flange portions 105c, which are coaxial with the bolt hole, and in these figures I have shown the flange portions 105e of less height than the coaxial flange portions 105c, but this is not important, except that it still further reduces the weight of the follower without diminishing its inherent strength.

In this instance, in order to bridge over the spaces between the ends of the flange portions 105e adjacent to the bolt holes, I preferably employ a bridge piece 107 which is preferably formed from a strip of steel or other metal bent into ring form with its opposite ends 107a, 107a in close proximity, and this ring 107 is placed in engagement with the main body of the follower and within the coaxial flange portions 105c thereof, as clearly shown in the drawings. This effectively bridges the otherwise open portions of the flanges adjacent to each of the bolt holes 108 and at the same time further reinforces the coaxial portions 105c of the follower without materially increasing the weight of the follower.

The bridge ring 107 is secured in place within the flange portions 105c of the body of the follower in any usual or desired manner. For example, it may be spot welded therein, as indicated at 105g, or in some instances, it may be secured in position by slightly upsetting the surrounding flange portions 105c, as indicated at 105h in Fig. 11, or it may be secured in any other suitable or desired manner.

As will be clearly understood, the followers formed in either of the ways hereinbefore described may be very cheaply made and will be relatively light in weight, while possessing a full measure of strength required for the compression of the packing rings or gaskets and the formation of a gas-tight joint.

What I claim and desire to secure by Letters Patent is:

1. A follower for pipe couplings comprising a plate member provided with a pipe aperture, an annular packing engaging portion surrounding said aperture circumferentially spaced, bolt engaging portions extending radially outwardly beyond the intervening portions of the plate member and provided with bolt holes, and perpendicularly disposed continuous flange portions following the outer edges of the plate member, and including separated flange portions concentric with the pipe aperture, and bridge portions formed separately from the plate member and extending from one of said concentric flange portions to another to form a gasket receiving recess surrounding and confining the gasket.

2. A follower for pipe couplings comprising a plate member provided with a pipe aperture, an annular packing engaging portion surrounding said aperture, outwardly extending bolt engaging portions provided with bolt holes, and perpendicularly disposed continuous flange portions following the outer edges of the plate member, and including separated flange portions concentric with the pipe aperture, said continuous flange portions being provided with shoulders at the ends of the concentric portions thereof, and separately formed curved bridge pieces engaging adjacent shoulders and connecting adjacent ends of said coaxial flange portions, and united permanently to said plate member, the inner faces of said bridge pieces forming continuations of the inner faces of said coaxial flange portions.

3. A follower for pipe couplings comprising a plate member provided with a pipe aperture, an annular packing engaging portion surrounding said aperture, outwardly extending bolt engaging portions provided with bolt holes, and perpendicularly disposed continuous flange portions following the outer edges of the plate member, and including separated flange portions concentric with the pipe aperture, and a bridge member comprising a strip of metal bent into ring form and located within said concentric flange portions of the plate member, and having its inner edge engaging the packing engaging portion of the plate member.

CLYDE J. MARTIN.